(12) United States Patent
Suzuki

(10) Patent No.: US 10,163,192 B2
(45) Date of Patent: Dec. 25, 2018

(54) IMAGE ENCODING APPARATUS AND METHOD OF CONTROLLING THE SAME

(71) Applicant: CANON KABUSHIKI KAISHA, Tokyo (JP)

(72) Inventor: Ryota Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 15/299,507

(22) Filed: Oct. 21, 2016

(65) Prior Publication Data

US 2017/0118477 A1    Apr. 27, 2017

(30) Foreign Application Priority Data

Oct. 27, 2015  (JP) ................................. 2015-211105
Aug. 2, 2016   (JP) ................................. 2016-152293

(51) Int. Cl.
*G06T 3/40* (2006.01)
*H04N 9/64* (2006.01)
*H04N 19/186* (2014.01)
*H04N 19/146* (2014.01)
*H04N 19/63* (2014.01)
*H04N 19/124* (2014.01)

(52) U.S. Cl.
CPC ............. *G06T 3/4015* (2013.01); *H04N 9/64* (2013.01); *H04N 19/124* (2014.11); *H04N 19/146* (2014.11); *H04N 19/186* (2014.11); *H04N 19/63* (2014.11)

(58) Field of Classification Search
CPC ...... G06T 3/4015; H04N 19/124; H04N 9/64; H04N 19/146; H04N 19/186; H04N 19/63
See application file for complete search history.

(56) References Cited

U.S. PATENT DOCUMENTS

| | | | |
|---|---|---|---|
| 5,845,041 A * | 12/1998 | Ohkuma | H04N 5/783 386/263 |
| 5,856,997 A | 1/1999 | Mochizuki et al. | 345/200 |
| 7,480,417 B2 | 1/2009 | Malvar | 382/244 |
| 2003/0228061 A1 * | 12/2003 | Sakuyama | G06T 3/4084 382/233 |
| 2006/0013312 A1 * | 1/2006 | Han | H04N 19/134 375/240.19 |
| 2006/0083432 A1 | 4/2006 | Malvar | 382/232 |

(Continued)

FOREIGN PATENT DOCUMENTS

JP    2003-125209    4/2003
JP    2006-121669    5/2006

*Primary Examiner* — Tat C Chio
(74) *Attorney, Agent, or Firm* — Venable LLP

(57) ABSTRACT

This invention enables compression-coding of image data of a Bayer arrangement more efficiently. For this purpose, an encoding apparatus includes a generation unit which generates, from G0 and G1 component data of the image data of the Bayer arrangement, a GL plane formed from low-frequency component data of a G component and a GH plane formed from high-frequency component data of the G component, a luminance/color difference transforming unit which generates, from R and B component data of the image data of the Bayer arrangement and the GL plane, a luminance plane, a first color difference plane, and a second color difference plane, and an encoding unit which encodes the luminance plane, the first color difference plane, the second color difference plane, and the GH plane.

12 Claims, 12 Drawing Sheets

(56) References Cited

U.S. PATENT DOCUMENTS

2009/0304273 A1* 12/2009 Fukuhara ............. H04N 19/647
　　　　　　　　　　　　　　　　　　　　　　382/166
2013/0300893 A1* 11/2013 Takada ................. H04N 19/635
　　　　　　　　　　　　　　　　　　　　　　348/223.1
2016/0140696 A1*  5/2016 Yamada .................... G06T 5/20
　　　　　　　　　　　　　　　　　　　　　　382/167

* cited by examiner

FIG. 6

|  |  |
|---|---|
| LL 45% (18%) | HL 22% (8.8%) |
| LH 22% (8.8%) | HH 11% (4.4%) |

Y PLANE: 40%

|  |  |
|---|---|
| LL 40% (12%) | HL 20% (6%) |
| LH 20% (6%) | HH 20% (6%) |

GH PLANE: 30%

|  |  |
|---|---|
| LL 45% (6.75%) | HL 22% (3.3%) |
| LH 22% (3.3%) | HH 11% (1.65%) |

U PLANE: 15%

|  |  |
|---|---|
| LL 45% (6.75%) | HL 22% (3.3%) |
| LH 22% (3.3%) | HH 11% (1.65%) |

V PLANE: 15%

FIG. 11A

Y PLANE: 35%

IN 1/3 COMPRESSION

| 3LL 1% | 3HL 1% | 2HL 3% | 1HL 8% |
|---|---|---|---|
| 3LH 1% | 3HH 1% | | |
| 2LH 3% | | 2HH 2% | |
| 1LH 8% | | | 1HH 7% |

U/V PLANE: 23%

| 3LL 1% | 3HL 1% | 2HL 2% | 1HL 5% |
|---|---|---|---|
| 3LH 1% | 3HH 1% | | |
| 2LH 2% | | 2HH 1% | |
| 1LH 5% | | | 1HH 4% |

G/H PLANE: 19%

| 3LL 1% | 3HL 1% | 2HL 2% | 1HL 3% |
|---|---|---|---|
| 3LH 1% | 3HH 1% | | |
| 2LH 2% | | 2HH 2% | |
| 1LH 3% | | | 1HH 3% |

FIG. 11B

IN 1/5 COMPRESSION

| 3LL 1% | 3HL 1% | 2HL 4% | 1HL 11% |
|---|---|---|---|
| 3LH 1% | 3HH 1% | | |
| 2LH 4% | | 2HH 3% | |
| 1LH 11% | | | 1HH 8% |

Y PLANE: 45%

| 3LL 1% | 3HL 1% | 2HL 2% | 1HL 4% |
|---|---|---|---|
| 3LH 1% | 3HH 1% | | |
| 2LH 2% | | 2HH 1% | |
| 1LH 4% | | | 1HH 2% |

U/V PLANE: 19%

| 3LL 1% | 3HL 1% | 2HL 2% | 1HL 2% |
|---|---|---|---|
| 3LH 1% | 3HH 1% | | |
| 2LH 2% | | 2HH 2% | |
| 1LH 2% | | | 1HH 3% |

G/H PLANE: 17%

IMAGE ENCODING APPARATUS AND METHOD OF CONTROLLING THE SAME

BACKGROUND OF THE INVENTION

Field of the Invention

The present invention relates to an encoding technique for image data of a Bayer arrangement.

Description of the Related Art

An image capturing apparatus represented by a digital camera generally includes an image sensor of a Bayer arrangement. The Bayer arrangement is a structure with red (R), green (G), and blue (B) pixels arranged in a mosaic. Additionally, 2×2 pixels in the Bayer arrangement include one red pixel (R), two green pixels (G0 and G1), and one blue pixel (B). Hence, the pixels of image data immediately after imaging by the image sensor also have the Bayer arrangement.

Each pixel of the image data of the Bayer arrangement has only the information of one color component, as described above. Hence, interpolation processing called demosaicing is generally applied to the image data of the Bayer arrangement to generate image data in which one pixel includes a plurality of components of R (red), G (green) and B (blue). From the viewpoint of a recording or transfer efficiency, the image data obtained by demosaicing is encoded to compress the data amount. JPEG (Joint Photographic Experts Group) that is representative compression coding transforms image data in the RGB color space into image data in the YUV color space and then compression-codes the image data. However, if the number of bits per component is the same, the data amount of the image data after demosaicing is three-times larger than the data amount of the image data of the Bayer arrangement before demosaicing. That is, JPEG encodes image data whose data amount is three-times larger than that of the image data of the Bayer arrangement.

There is known a technique of separating image data of the Bayer arrangement into components (R, G0, B, and G1) and independently encoding the image data of each component without performing demosaicing (for example, Japanese Patent Laid-Open No. 2003-125209 that will be referred to as literature 1 hereinafter).

Half of the pixels included in image data of the Bayer arrangement are the G component pixels. Hence, how to efficiently encode the G component pixels is important. In the method of literature 1, a G0 component and a G1 component, whose original pixel positions are close and which are of the same color and have a high correlation, are separated into different components. For this reason, wavelet transformation in encoding processing is performed in a state in which the image data of the Bayer arrangement is sub-sampled. Hence, folding noise is applied when separating the high-frequency component and the low-frequency component, resulting in a lower compression ratio.

There is also known a technique of performing color space transformation of image data of the Bayer arrangement to generate one luminance component (Y) and three color difference components (Dg, Co, and Cg) and encoding the image data of each component (for example, Japanese Patent Laid-Open No. 2006-121669 that will be referred to as literature 2 hereinafter). This is one of compression efficiency improving methods aiming at reducing redundant data on a color component basis, and uses the visual sensitivity of human eyes that are sensitive to the luminance component. In this method, the Dg component is represented by G1-G0 (a high-pass filter by differentiation), and a high-frequency component corresponding to the G component is calculated. In literature 2, however, since a low-frequency component corresponding to the G component is not calculated, there is still room for improvement of the compression efficiency.

SUMMARY OF THE INVENTION

The present invention provides a technique of compression-coding image data of a Bayer arrangement at a higher efficiency.

According to an aspect of the present invention, there is provided an image encoding apparatus for encoding image data of a Bayer arrangement, comprising: a generation unit configured to generate, from G0 component data and G1 component data of the image data of the Bayer arrangement, GL component data formed from low-frequency component of a G component and GH component data formed from high-frequency component of the G component; a luminance/color difference transforming unit configured to generate, from R component data and B component data of the image data of the Bayer arrangement and the GL component data, luminance component data formed from luminance component, first color difference component data formed from first color difference component, and second color difference component data formed from second color difference component; and an encoding unit configured to encode each component of the luminance component data, the first color difference component data, the second color difference component data, and the GH component data.

According to the present invention, it is possible to compression-code image data of a Bayer arrangement more efficiently than before.

Further features of the present invention will become apparent from the following description of exemplary embodiments (with reference to the attached drawings).

BRIEF DESCRIPTION OF THE DRAWINGS

FIG. 6 is a view showing an example of setting of a target code amount for each sub-band in each plane;

FIGS. 11A and 11B are views showing an example of setting of a target code amount for each sub-band in each plane according to the modification of the first embodiment.

DESCRIPTION OF THE EMBODIMENTS

Embodiments of the present invention will now be described in detail with reference to the accompanying drawings.

First Embodiment

Figure 1:
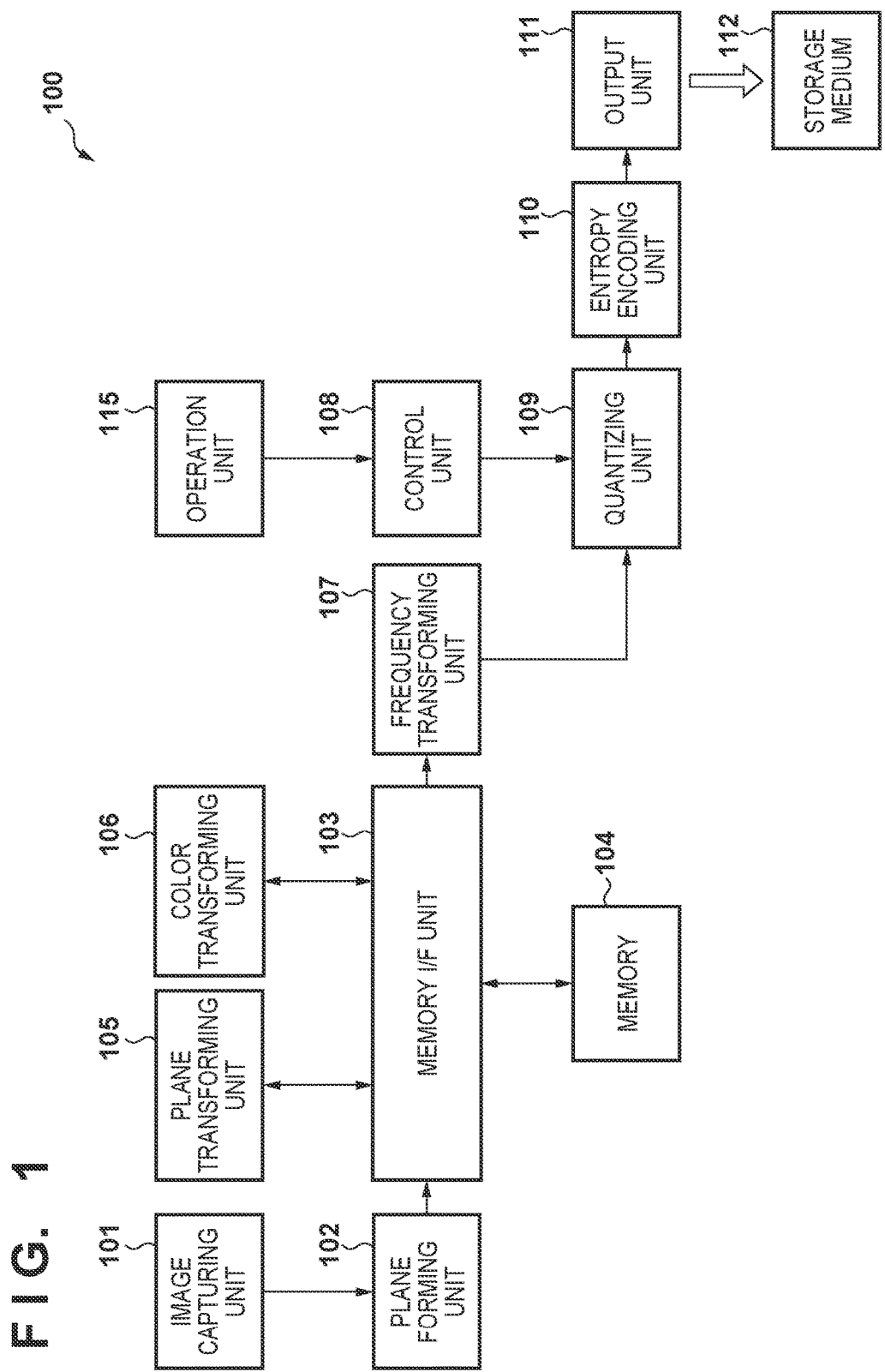
FIG. 1 is a block diagram showing the arrangement of an encoding apparatus according to the first embodiment.

In the first embodiment, an example of application to an image capturing apparatus represented by a digital camera will be described. FIG. 1 is a block diagram showing the arrangement of main part concerning image encoding in an image capturing apparatus 100. The image capturing apparatus 100 includes an image capturing unit 101, a plane forming unit 102, a memory I/F unit 103, a memory 104, a plane transforming unit 105, a color transforming unit 106, a frequency transforming unit 107, a control unit 108, a quantizing unit 109, an entropy encoding unit 110, and an output unit 111. Note that a storage medium 112 is, for example, a detachable memory card. This apparatus also includes an operation unit 115 functioning as a user interface.

The image capturing unit 101 has a structure in which sensors each configured to convert light into an electrical signal are two-dimensionally arranged. One of red (R), green (G), and blue (B) color filters is arranged in front of each sensor. The arrangement of the color filters is a Bayer arrangement. The image capturing unit 101 supplies the electrical signal of a color component obtained by each sensor as digital image data to the plane forming unit 102. Since the color filters have the Bayer arrangement, the pixels of the image data supplied to the plane forming unit 102 also have the Bayer arrangement. Image data to be encoded in the first embodiment is image data of the Bayer arrangement before demosaicing. Hence, the image data of the Bayer arrangement will be referred to as RAW image data hereinafter.

Figure 2:
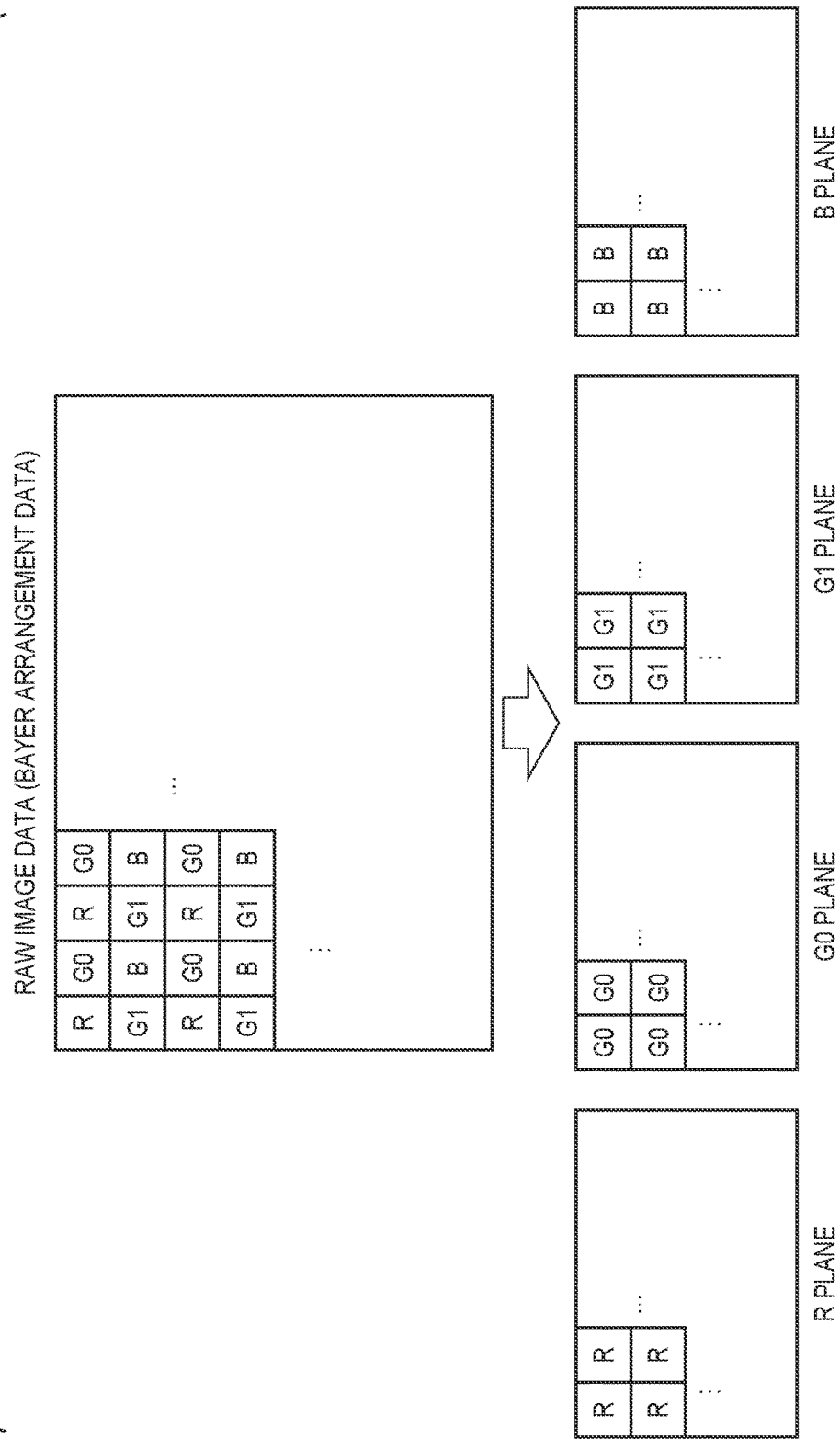
FIG. 2 is a view for explaining color separation of image data of a Bayer arrangement and a plane forming method.

The plane forming unit 102 receives the RAW image data from the image capturing unit 101. The plane forming unit 102 forms (separates) an R plane formed from R component data, a G0 plane formed from G0 component data, a G1 plane formed from G1 component data, and a B plane formed from B component data from the RAW image data. FIG. 2 shows the relationship between the RAW image data and the R, G0, G1, and B planes. Let W be the number of pixels in the horizontal direction of the RAW image data, and H be the number of pixels in the vertical direction. At this time, the number of pixels in the horizontal direction is W/2, and the number of pixels in the vertical direction is H/2 in each of the R, G0, G1, and B planes. The plane forming unit 102 temporarily stores the generated R plane, G0 plane, G1 plane, and B plane in the memory 104 via the memory I/F unit 103.

The memory I/F unit 103 arbitrates a memory access request from each processing unit to the memory 104 and controls read/write for the memory 104.

The memory 104 is provided to temporarily store and hold various kinds of data output from each processing unit and formed from a RAM.

The plane transforming unit 105 reads out the G0 plane and the G1 plane from the memory 104 via the memory I/F unit 103. The plane transforming unit 105 performs a predetermined pixel operation using the correlation between the two planes and generates high-frequency component (to be referred to as GH hereinafter) data and low-frequency component (to be referred to as GL hereinafter) data of the G component. The plane transforming unit 105 writes a GH plane formed from the generated GH data and a GL plane formed from the generated GL data in the memory 104 via the memory I/F unit 103. Details of the pixel operation performed by the plane transforming unit 105 will be described later.

The color transforming unit 106 reads out the GL plane, R plane, and B plane stored in the memory 104 via the memory I/F unit 103, and performs luminance/color difference transformation for the three planes. The color transforming unit 106 writes planes obtained by the luminance/color difference transformation to the memory 104 again via the memory I/F unit 103. The planes generated at this time are a Y plane representing a luminance Y and a U plane and a V plane which represent color differences U and V.

Figure 4:
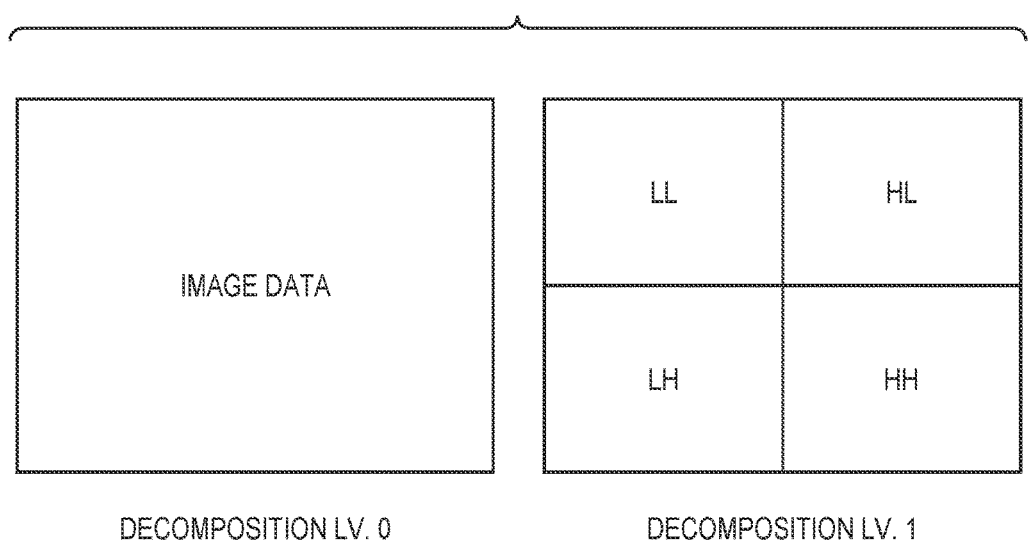
FIG. 4 is a view for explaining wavelet transformation.

The frequency transforming unit 107 executes wavelet transformation for the Y plane, the U plane, the V plane, and the GH plane read out from the memory 104 via the memory I/F unit 103. The frequency transforming unit 107 sends the transformation coefficient data of a plurality of types of sub-bands obtained by the wavelet transformation to the quantizing unit 109. The wavelet transformation is one of frequency analyzing methods and indicates processing of separating the frequency components of image data into a low frequency band (executing low-pass filter processing) and a high frequency band (executing high-pass filter processing). FIG. 4 shows a sub-band forming result obtained by executing two-dimensional wavelet transformation once (decomposition level 1) for input image data. "L" in FIG. 4 represents a low-frequency component, and "H" represents a high-frequency component. For example, an HH sub-band is an aggregate of transformation coefficient data obtained by performing high-pass filter processing in the vertical and horizontal directions. The wavelet transformation can be executed recursively any number of times. Second or subsequent wavelet transformation (from decomposition level 2) is performed for an LL sub-band obtained by wavelet transformation (here, the wavelet transformation of decomposition level 1) executed immediately before.

The control unit 108 controls the entire apparatus. The control unit 108 accepts a user instruction via the operation unit 115. The instruction includes a recording instruction, recording quality, the total target code amount of RAW image data, and the like. Upon receiving a user instruction input via the operation unit 115, the control unit 108 stores the instruction information in the internal memory (not shown) of the control unit 108. Based on the stored information, the control unit 108 sets, in the quantizing unit 109, plane target code amounts to be assigned to the Y plane, the U plane, the V plane, and the GH plane out of the total target code amount.

The quantizing unit 109 executes quantization for the transformation coefficient data supplied from the frequency transforming unit 107, and sends the transformation coefficient data after the quantization to the entropy encoding unit 110. Note that a quantization parameter (quantization step) to be used for the quantization is decided based on the plane target code amounts set by the control unit 108.

The entropy encoding unit 110 performs entropy encoding of the transformation coefficients after the quantization to generate encoded data. The entropy encoding unit 110 supplies the generated encoded data to the output unit 111.

The output unit 111 concatenates the encoded data of the Y plane, U plane, V plane, and GH plane supplied from the entropy encoding unit 110 in accordance with a preset format. The output unit 111 generates a file header including information necessary for decoding, and writes the file header and the encoded data in the storage medium 112 as one file. The storage medium 112 is, for example, a detachable nonvolatile memory such as an SD card.

Encoding processing for RAW image data (one frame) according to the first embodiment will be described next with reference to the flowchart of FIG. 3. Note that in the first embodiment, processing on a frame basis will be exemplified. However, one frame may be divided into a plurality of tiles, and encoding processing to be described later may be executed for each tile.

In step S301, the plane forming unit 102 inputs RAW image data of a Bayer arrangement output from the image capturing unit 101, and forms an R plane, a G0 plane, a G1 plane, and a B plane. The plane forming unit 102 writes the formed R plane, G0 plane, G1 plane, and B plane to the memory 104 via the memory I/F unit 103.

In step S302, the plane transforming unit 105 reads out the G0 plane and the G1 plane from the memory 104 via the memory I/F unit 103, and generates a GL plane formed from GL component data.

Figure 5:
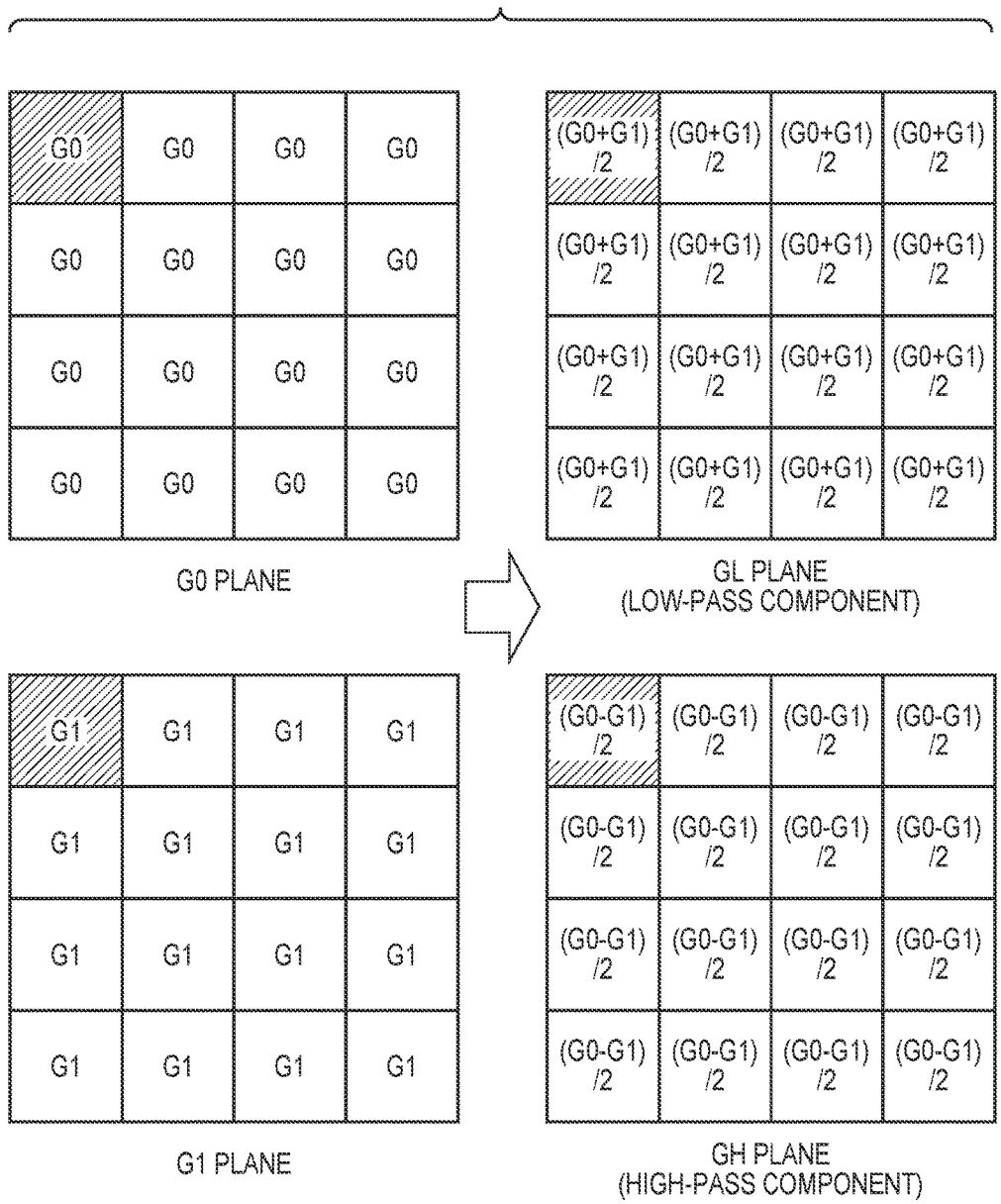
FIG. 5 is a view for explaining a method of generating a low-frequency component plane and a high-frequency component plane using a G0 plane and a G1 plane.

A method of generating the GL component data will be described with reference to FIG. 5. The plane transforming unit 105 performs addition averaging of pixel data at the same coordinate position in the input G0 plane and G1 plane, and generates the addition average value as GL component data. That is, the GL plane is an aggregate of addition averages of the G0 plane and the G1 plane. The addition average processing is moving average (integration) processing between the pixels, and is equivalent to low-pass filter processing. The addition average value corresponds to low-frequency component data of the G component. The plane transforming unit 105 writes the generated GL plane to the memory 104 via the memory I/F unit 103.

In step S303, the plane transforming unit 105 reads out the G0 plane and the G1 plane from the memory 104 via the memory I/F unit 103, and generates a GH plane formed from GH component data. More specifically, as shown in FIG. 5, the plane transforming unit 105 calculates the subtraction average of pixel data at the same coordinate position in the input G0 plane and G1 plane, and generates the subtraction average value as GH component data. That is, the GH plane is an aggregate of subtraction averages of the G0 plane and the G1 plane. The subtraction average processing is moving difference (differentiation) processing between the two, G0 and G1 planes, and is equivalent to high-pass filter processing. The subtraction average value corresponds to high-frequency component data of the G component. The plane transforming unit 105 writes the generated GH plane to the memory 104 via the memory I/F unit 103.

In step S304, the color transforming unit 106 reads out the GL plane, the R plane, and the B plane from the memory 104 via the memory I/F unit 103, and performs luminance/color difference transformation to generate one luminance plane and two color difference planes. More specifically, the color transforming unit 106 generates a Y plane formed from luminance component data, a U plane formed from color difference component data of the color difference U, and a V plane formed from color difference component data of the color difference V by performing luminance/color difference transformation in accordance with $$Y = \left\lfloor \frac{R + B + 2GL}{4} \right\rfloor \quad (1)$$
$$U = R - GL$$
$$V = B - GL$$

where $\lfloor x \rfloor$ is the floor function that returns a maximum integer equal to or smaller than a real number x. Note that the luminance/color difference transformation according to the first embodiment will be described by exemplifying an integer type reversible component transformation. However, any other transformation of the same type is also applicable.

In step S305, the frequency transforming unit 107 reads out the Y plane, the U plane, the V plane, and the GH plane from the memory 104 via the memory I/F unit 103. The frequency transforming unit 107 executes wavelet transformation for the readout planes to form sub-bands. Note that the frequency transformation according to the first embodiment is not limited to wavelet transformation, and discrete cosine transform used in an encoding technique such as JPEG may be used instead.

In step S306, the control unit 108 decides the ratio of plane target code amounts of the planes by referring to the information stored in the memory of its own. Considering the visual sensitivity characteristic of a human, the control unit 108 decides the ratio of plane target code amounts such that the target code amount of the Y plane becomes larger than the target code amounts of other planes. Note that as for the ratio of the plane target code amounts of the U plane, the V plane, and the GH plane except the Y plane, the plane target code amounts may be assigned at even ratios, or the ratio may be changed.

In addition, the control unit 108 decides the sub-band target code amounts of sub-bands generated by executing the wavelet transformation by the frequency transforming unit 107 for each plane. In general, a large amount of energy of the image concentrates to the sub-band in the low frequency band out of the sub-bands obtained by the wavelet transformation. Hence, to suppress degradation of image quality, it is necessary to set the ratio of the sub-band target code amounts in the same decomposition level such that the ratio of the sub-band target code amount of the low-frequency sub-band becomes higher. On the other hand, the GH plane includes many high-frequency components of the G component. For this reason, as for the GH plane, the degradation of an edge of the image or the like increases at a high possibility if the target code amount is set by preferentially setting only the sub-band target code amount of the low frequency sub-band. To prevent this, the ratio of the sub-band target code amount of the HH sub-band of the GH plane is set to be higher than the ratio of the sub-band target code amount of the HH sub-band set in other planes. With this setting, it is possible to leave the information of the high-frequency component and suppress degradation of the edge of the image or the like.

FIG. 6 shows an example of setting of a sub-band target code amount ratio of each sub-band in each plane. In the case shown in FIG. 6, the ratio of the plane target code amounts of the planes is Y:U:V:GH=40:15:15:30(%). The ratio of the sub-band target code amounts of the sub-bands in the GH plane is LL:HL:LH:HH=40:20:20:20. The ratio of the sub-band target code amounts of the sub-bands in the planes other than the GH plane is LL:HL:LH:HH=45:22:22:11. The control unit 108 decides the distribution ratio of the plane target code amounts of the planes such that the total target code amount of the entire RAW data becomes 100%. The control unit 108 then decides the sub-band target code amounts such that the plane target code amount of one plane becomes 100%.

Note that in the sub-band forming result shown in FIG. 6, the sub-band division count by wavelet transformation is 1, for the descriptive convenience. Letting T be the total target code amount of the entire RAW data when setting the plane target code amount ratio under the condition shown in FIG. 6, the control unit 108 obtains the sub-band target code amounts as follows.

[Y Plane]
Sub-band target code amount of LL sub-band=T×(40/100)×(45/100)
Sub-band target code amount of HL sub-band=T×(40/100)×(22/100)
Sub-band target code amount of LH sub-band=T×(40/100)×(22/100)
Sub-band target code amount of HH sub-band=T×(40/100)×(11/100)

[U Plane]
Sub-band target code amount of LL sub-band=T×(15/100)×(45/100)
Sub-band target code amount of HL sub-band=T×(15/100)×(22/100)
Sub-band target code amount of LH sub-band=T×(15/100)×(22/100)
Sub-band target code amount of HH sub-band=T×(15/100)×(11/100)

[V Plane]
Sub-band target code amount of LL sub-band=T×(15/100)×(45/100)
Sub-band target code amount of HL sub-band=T×(15/100)×(22/100)
Sub-band target code amount of LH sub-band=T×(15/100)×(22/100)
Sub-band target code amount of HH sub-band=T×(15/100)×(11/100)

[GH Plane]
Sub-band target code amount of LL sub-band=T×(30/100)×(40/100)
Sub-band target code amount of HL sub-band=T×(30/100)×(20/100)
Sub-band target code amount of LH sub-band=T×(30/100)×(20/100)
Sub-band target code amount of HH sub-band=T×(30/100)×(20/100)

Note that FIG. 6 shows the target code amount assigned to each sub-band when the total target code amount of the entire RAW data is 100% as a parenthesized numerical value.

In step S307, the quantizing unit 109 quantizes the transformation coefficient data supplied from the frequency transforming unit 107 after the frequency transformation in accordance with the type of a plane and a sub-band to which each transformation coefficient data belongs. A quantization parameter to be used by the quantizing unit 109 is decided based on the sub-band target code amounts calculated in step S306.

In step S308, the entropy encoding unit 110 compression-codes the transformation coefficient data of each sub-band after the quantization, and supplies the encoded data to the output unit 111. The output unit 111 concatenates the encoded data of the sub-bands of the planes in accordance with a preset order. The output unit 111 also creates a file header including information necessary for decoding. The information stored in the file header includes the numbers of horizontal and vertical pixels of the RAW image data, the number of bits per pixel, quantization parameter for each type of the planes and sub-bands, and the like. The output unit 111 writes a file formed from the file header and the subsequent encoded data to the storage medium 112.

As described above, according to the first embodiment, the image capturing apparatus 100 generates independent planes of R, G0, G1, and B color component data from RAW image data of the Bayer arrangement. The image capturing apparatus 100 performs addition average processing of the G0 and G1 planes out of these planes, thereby generating a GL plane. The image capturing apparatus 100 also performs subtraction average processing of the G0 and G1 planes, thereby generating a GH plane. Since the addition averaging is a low-pass filter operation, the GL plane generation processing corresponds to processing of extracting the low-frequency component of the G component of the RAW data. Since the subtraction averaging is a high-pass filter operation, the GH plane generation processing corresponds to processing of extracting the high-frequency component of the G component of the RAW data. To further increase the encoding efficiency, the image capturing apparatus 100 according to the first embodiment transforms the GL, R, and B planes into Y, U, and V planes representing the luminance and color differences. The image capturing apparatus 100 performs frequency transformation, quantization, and entropy encoding for the GH plane in addition to the Y, U, and V planes obtained by the transformation.

As described above, the image capturing apparatus 100 (encoding apparatus) according to the first embodiment generates the high-frequency component and the low-frequency component of the G component in advance before frequency transformation. This can suppress folding noise generated by sub-sampling upon forming the G0 and G1 planes and reduce lowering of the frequency transformation efficiency. Luminance/color difference transformation to YUV is performed using the R plane, the GL plane, and the B plane. To weight the target code amounts according to the visual sensitivity characteristic, the Y plane is assigned a larger target code amount than the other planes. This can increase the compression ratio of encoding processing while suppressing degradation of image quality.

In the first embodiment, the control unit 108 sets, in the quantizing unit 109, a sub-band target code amount according to the type of a plane and the type of a sub-band, thereby adjusting the code amount. However, the present invention is not limited to this. For example, in JPEG 2000 as well, transformation coefficient data obtained by wavelet transformation is quantized. In JPEG 2000, a bit plane formed by data at the same bit position of the transformation coefficient data obtained by the quantization is regarded as binary data, and entropy encoding (arithmetic coding) is performed on a bit plane basis. Assume that the encoded data of the bit plane of the ith bit of a sub-band of interest of a certain color component of interest is expressed as Ci, and the code amount is represented by A(Ci). At this time, a total code amount C_total of the encoded data of the sub-band of interest of the color component of interest is given by $$C\_total = \Sigma A(Ci) \ (i=0, 1, 2, \ldots, MSB)$$

Hence, letting A_Target be the target code amount of the sub-band of interest of the color component of interest, the minimum value of k that meets $$C\_total - \Sigma A(Ck) \leq A\_Target$$

is calculated. Then, the encoded data of bit planes from bit 0 to bit k are discarded. In the following embodiments as well, a description will be made assuming that the code amount is adjusted by the quantization parameter, as in the first embodiment. However, the code amount may be adjusted by bit plane discarding processing by exploiting the advantage of employing JPEG 2000.

[First Modification of First Embodiment]

In the first embodiment, an example of application of an image capturing apparatus has been described. An example of implementation by an application program to be executed by a general-purpose information processing apparatus such as a personal computer will be described below as a modification of the first embodiment.

Figure 10:
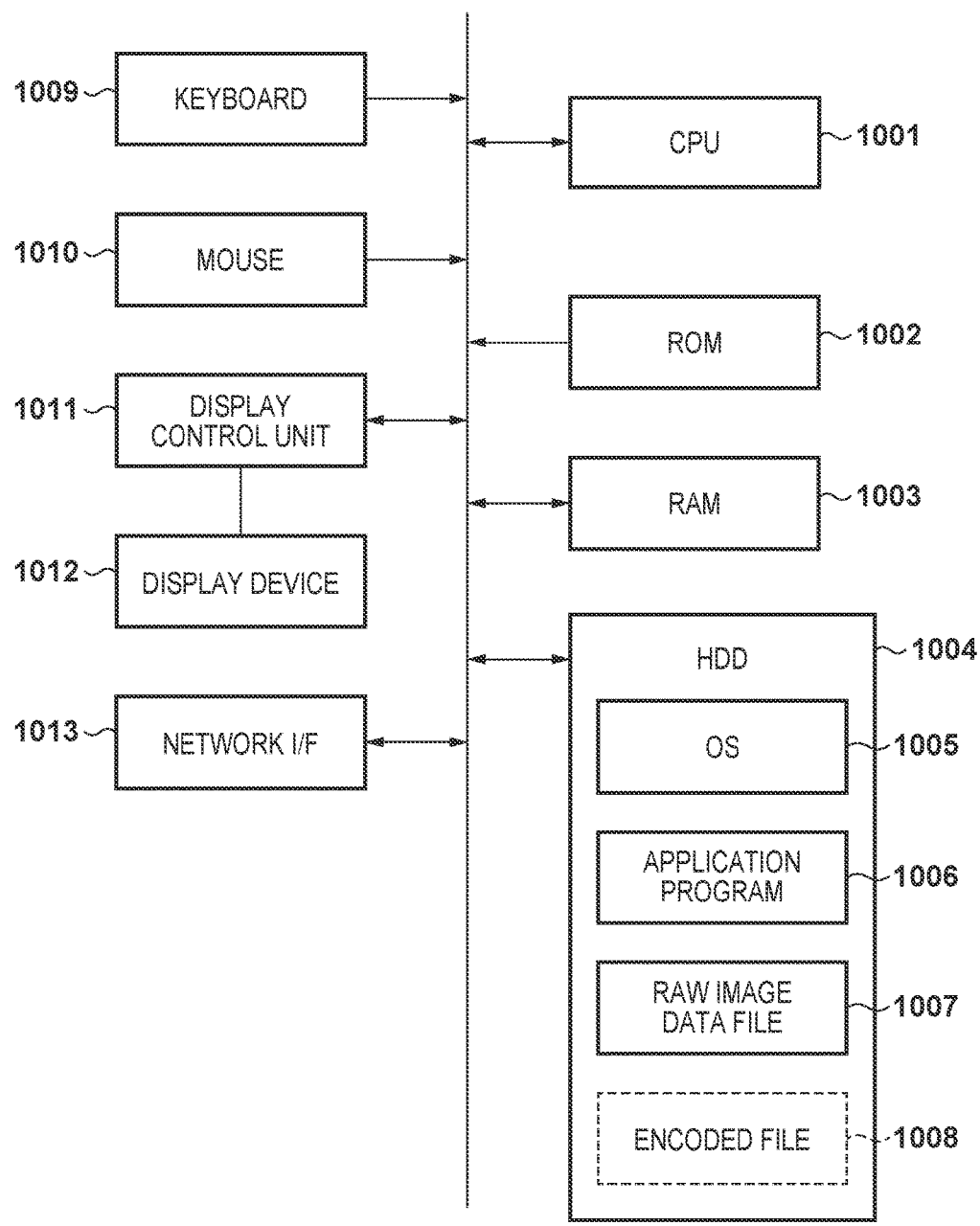
FIG. 10 is a block diagram showing the arrangement of an information processing apparatus according to a modification of the first embodiment.

FIG. 10 is a block diagram showing the arrangement of an information processing apparatus according to this modification. When the apparatus is powered on, a CPU 1001 executes a boot program stored in a ROM 1002, loads an OS (Operating System) 1005 from an HDD (Hard Disk Drive) 1004 to a RAM 1003, and executes the OS. As a result, the CPU 1001 can accept a user instruction via a keyboard 1009 and a mouse 1010 and control a display control unit 1011 to display a menu or the like on a display device 1012. That is, the apparatus functions as an information processing apparatus used by the user. When the user instructs to activate an application program 1006 from the mouse 1010 or the like, the CPU 1001 loads the application program 1006 to the ROM 1002 and executes it. As a result, the apparatus functions as an image processing apparatus for encoding RAW image data. Then, unencoded RAW image data included in a RAW image data file 1007 stored in the HDD 1004 is encoded to generate an encoded file 1008.

Figure 3:
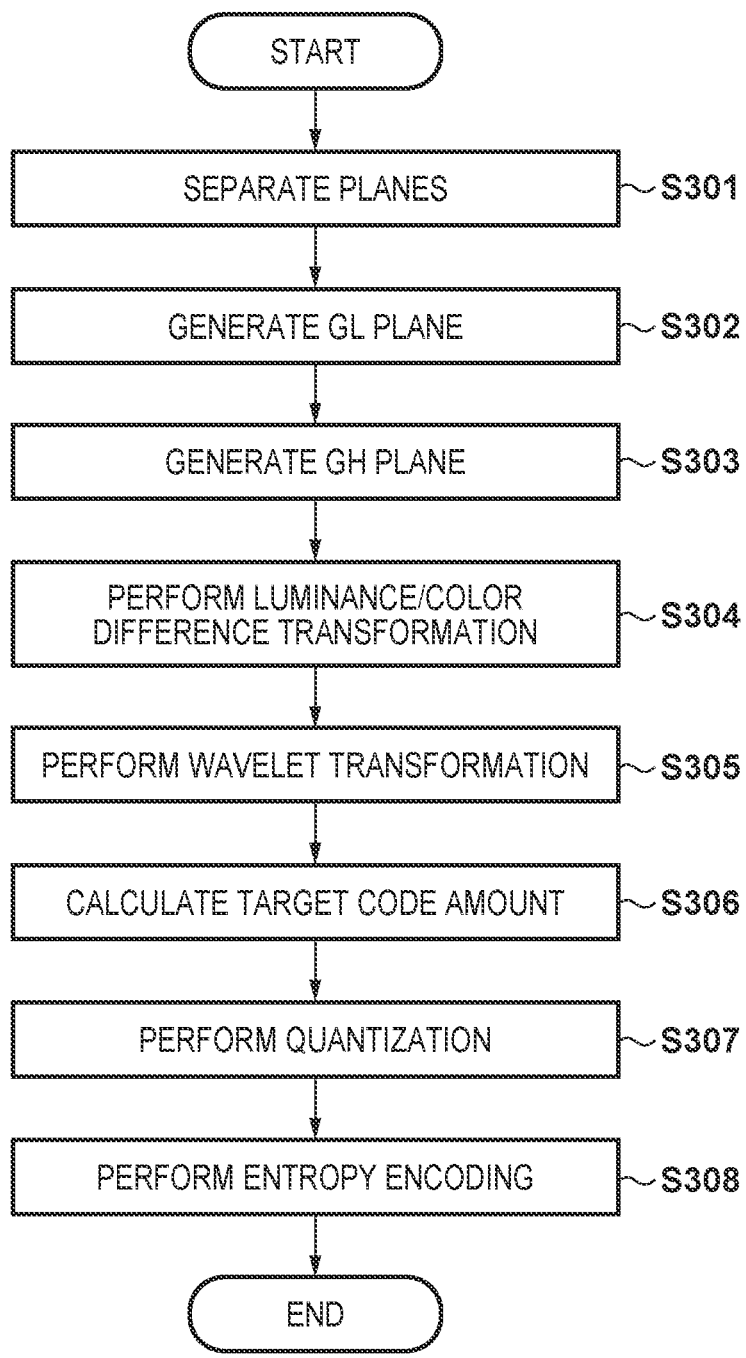
FIG. 3 is a flowchart of encoding processing according to the first embodiment.

In the above modification, the processing procedure of the CPU 1001 when executing the application program 1006 is almost the same as that of the flowchart of FIG. 3. As a different point, the CPU 1001 executes each step of FIG. 3. In addition, the RAM 1003 is used as the memory 104 in FIG. 1 or the memory used for temporary storage in each step.

[Second Modification of First Embodiment]

In the first embodiment, the target code amount ratio is set as shown in FIG. 6. A case in which the target code amount is set by another method will be explained as the second modification.

In this modification, wavelet transformation is performed up to decomposition level 3, and a target code amount is assigned to each sub-band, as shown in FIGS. 11A and 11B. Note that in this modification, the distribution ratio of the target code amount to each plane or each sub-band is changed in accordance with the compression ratio set by the user using the operation unit 115 and a display unit (not shown) of the image capturing apparatus 100. The compression ratio is set by the user via the operation unit and the display unit. However, the user may automatically set the compression ratio in accordance with the imaging mode of the image capturing apparatus 100.

FIG. 11A shows the target code amount ratios of the planes and sub-bands when 1/3 compression is set as the compression ratio, and FIG. 11B shows the code amount ratios of the planes and sub-bands when 1/5 compression is set.

The target code amount of an entire RAW image is defined as 100%. In the 1/3 compression, the target code amounts are assigned at a ratio of 35% to the Y plane, 23% to the U and V planes each, and 19% to the GH plane. In the 1/5 compression, the target code amounts are assigned at a ratio of 45% to the Y plane, 19% to the U and V planes each, and 17% to the GH plane. That is, in this modification, the target code amounts are set such that target code amount of Y plane>target code amount of U plane=target code amount of V plane>target code amount of GH plane.

In image data, a luminance component is an important component. Hence, the Y plane is assigned a larger code amount than the other planes. In addition, the Y plane, the U plane, and the V plane are components necessary to form an RGB image and are therefore assigned larger code amounts than the GH plane.

In the 1/5 compression, the entire code amount is smaller than in the 1/3 compression. If the ratio of planes is the same as in the 1/3 compression, the code amount assigned to the Y plane is small. Hence, in the 1/5 compression, the distribution ratio of the target code amount of the Y plane is set to be higher than in the 1/3 compression, thereby allocating the code amount of the Y plane.

The code amount assigned to each plane is further assigned to the sub-bands. In FIGS. 11A and 11B, the target code amount of the entire RAW image is defined as 100%, and the distribution ratio of target code amounts to the sub-bands is illustrated. In image data, the low-frequency component is more important than the high-frequency component. For this reason, in the Y, U, and V planes, the target code amounts are set such that HL sub-band=LH sub-band>HH sub-band in decomposition levels 2 and 1. On the other hand, in the GH plane, the target code amounts are set such that HL sub-band=LH sub-band HH sub-band in decomposition levels 2 and 1. Since the GH plane is data corresponding to the high-frequency component of green, the data of the high-frequency component has a more important role than in the Y, U, and V planes. For this reason, in the GH plane, the target code amount of the HH sub-band is set to be larger than those of the HL and LH sub-bands.

In this modification, in the 1/3 compression, the target code amounts are set such that HL sub-band=LH sub-band=HH sub-band in decomposition levels 1 and 2 of the GH plane. In the 1/5 compression, the target code amounts are set such that HL sub-band=LH sub-band<HH sub-band in decomposition levels 1 and 2 of the GH plane.

However, the present invention is not limited to this. Even if HL sub-band=LH sub-band>HH sub-band, the target code amounts may be set by adding a larger weight to the high-frequency component in the GH plane than in the other planes. For example, the ratio of the target code amount of the HH sub-band to the HL sub-band or LH sub-band in the GH plane is set to be higher than the ratio of the target code amount of the HH sub-band to the HL sub-band or LH sub-band in the Y, U, and V planes, thereby weighting the sub-band of the high-frequency component of the GH plane and setting the target code amount.

Second Embodiment

As for the code amount control performed by the control unit 108 according to the first embodiment, a static target code amount setting method of making the plane target code amount of the Y plane larger than the target code amounts of the other planes has been explained. In the second embodiment, however, a method of estimating the generated code amount of the GH plane from the variance of each color plane output from a plane forming unit 102 and thus dynamically setting the plane target code amounts of the GH plane, the R plane, and the B plane will be described.

In addition, the plane transforming unit 105 according to the first embodiment performs a predetermined pixel operation for a unit of two, G0 and G1 pixels located in an oblique direction of the Bayer arrangement, thereby calculating the high-frequency component and the low-frequency component of the G component. In the second embodiment, however, a method of performing a predetermined pixel operation for a unit of G0 and G1 pixels of two lines adjacent in the vertical direction or a unit of G0 and G1 pixels of two columns adjacent in the horizontal direction to calculate the high-frequency component and the low-frequency component of the G component will also be described.

Figure 7:
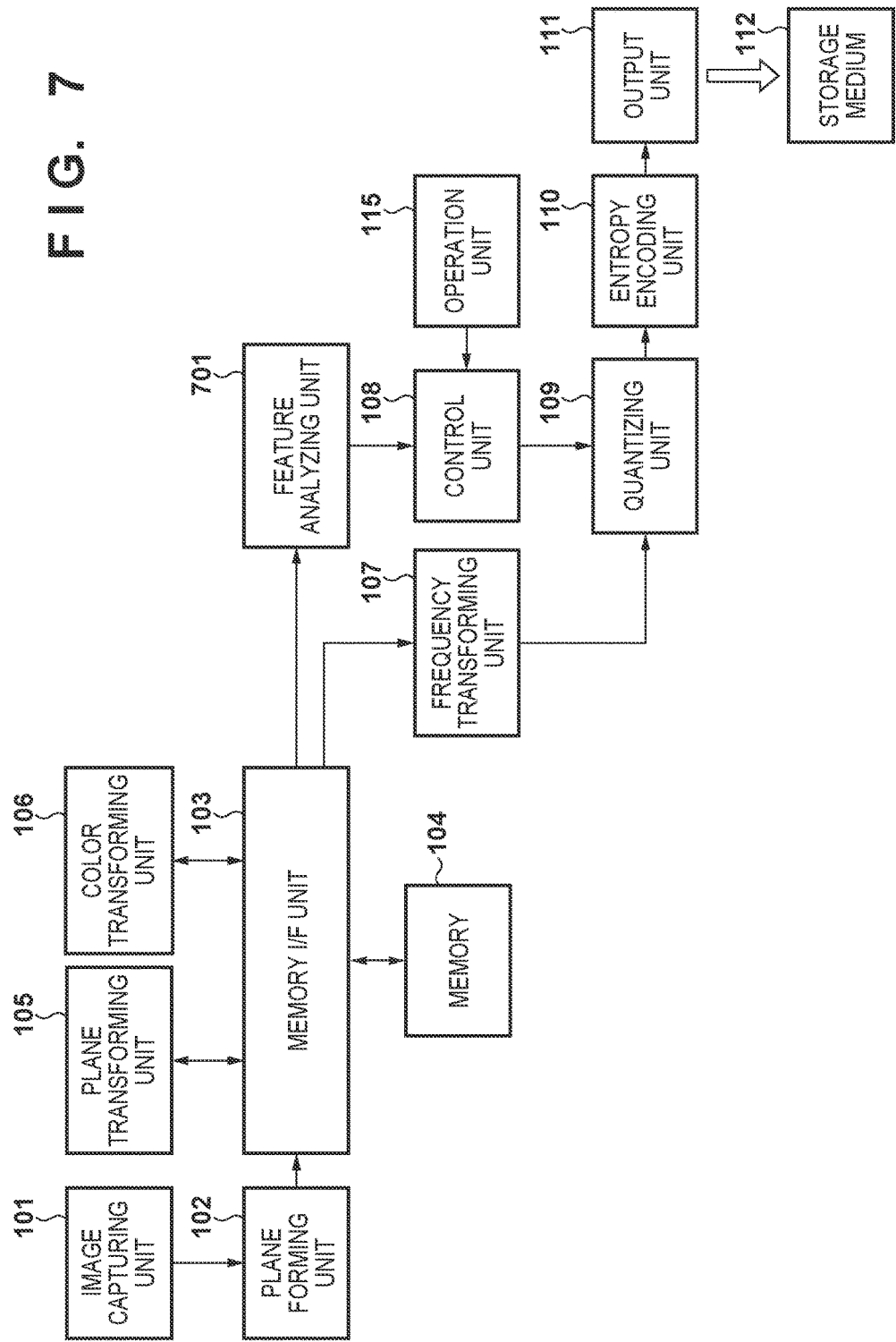
FIG. 7 is a block diagram showing the arrangement of an encoding apparatus according to the second embodiment.

FIG. 7 is a block diagram showing the arrangement of main part concerning image encoding in an image capturing apparatus 700 according to the second embodiment. Unlike FIG. 1 of the first embodiment, a feature analyzing unit 701 is added. The feature analyzing unit 701 reads out the G0 plane stored in a memory 104 and calculates the variance of the G0 plane. The feature analyzing unit 701 supplies the calculated variance information to a code amount control unit 108. Note that the color component used in variance calculation according to the second embodiment is the G plane. However, the average of the variances of the R plane, the G plane, and the B plane may be calculated. At least one of the constituent elements of the image capturing apparatus 700 according to the second embodiment has a hardware arrangement.

In general, an image in which many edges exist has a large variance, and the generated code amount of the GH plane representing the high-frequency component of the G component is large. Hence, if the variance is large, a larger plane target code amount is assigned to the GH plane, thereby easily maintaining the edges of the image. This is the purpose of calculating the variance.

Figure 8:
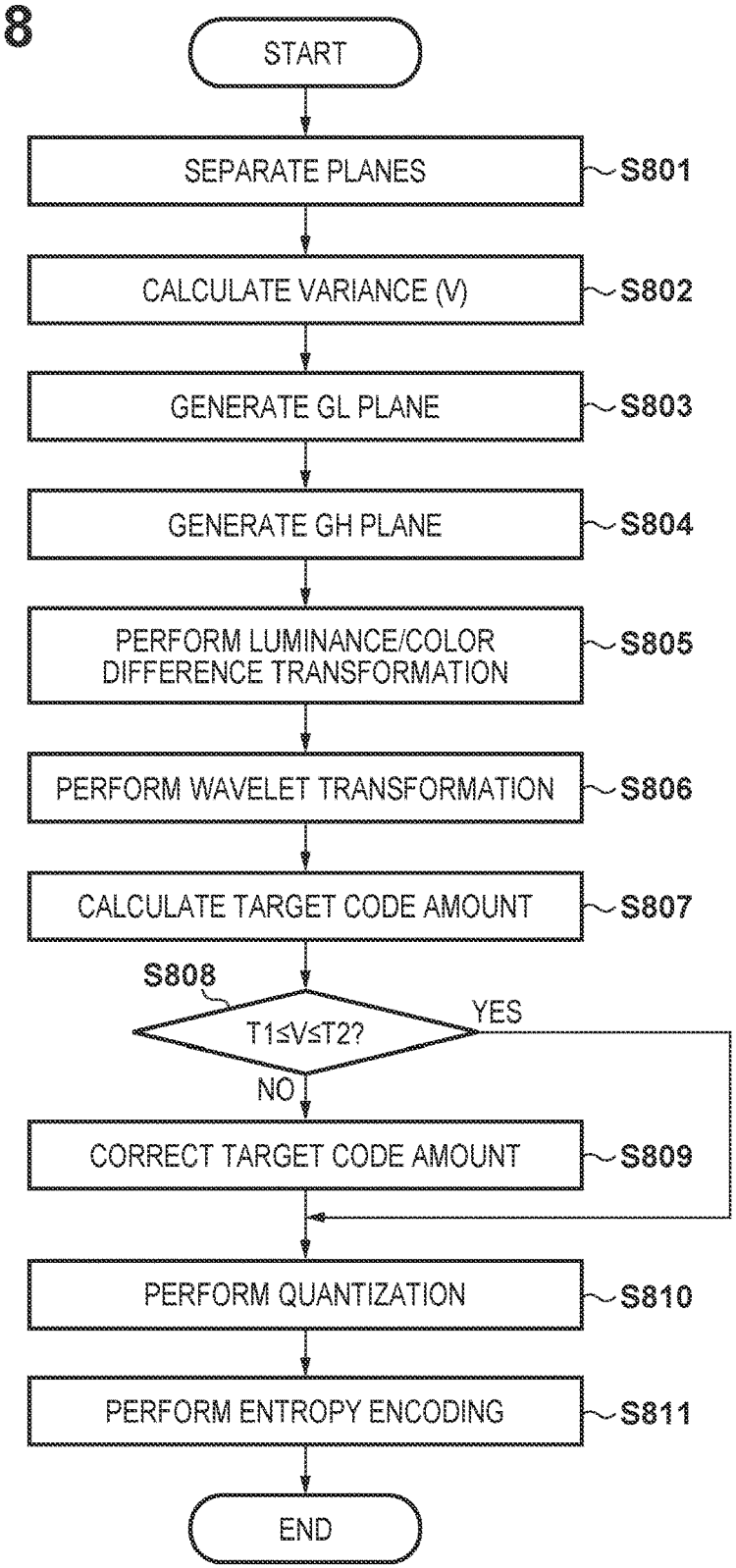
FIG. 8 is a flowchart of encoding processing according to the second embodiment.

Encoding processing for one frame of RAW image data in an image capturing apparatus 100 according to the second embodiment will be described below with reference to the flowchart of FIG. 8. Note that here, processing on a frame basis will be exemplified. However, one frame may be divided into tiles of an arbitrary size, and encoding processing to be described later may be executed independently for each tile.

Figure 9:
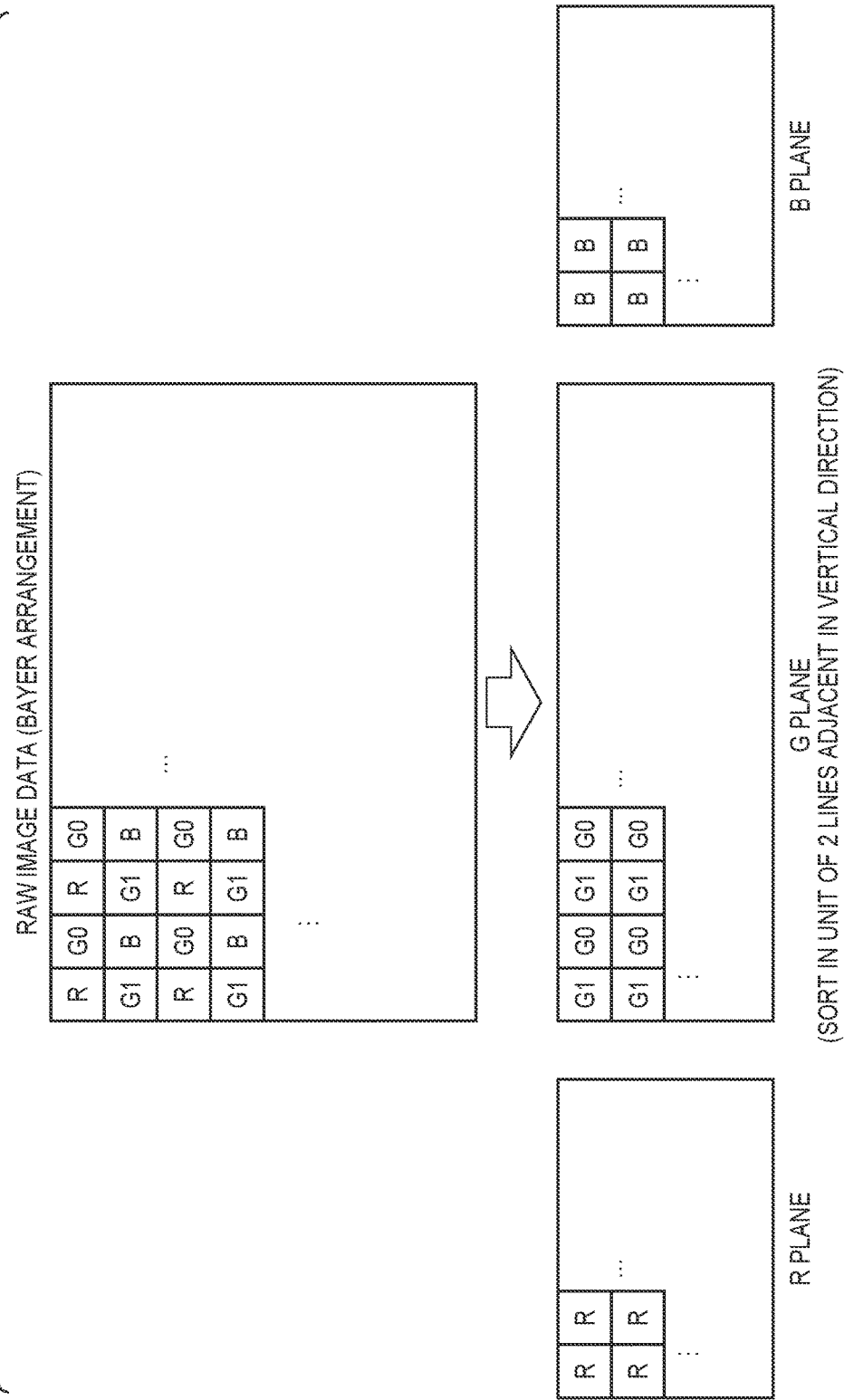
FIG. 9 is a view showing another example of color separation of image data of a Bayer arrangement and a plane forming method.

In step S801, the plane forming unit 102 forms independent planes of R, G, and B color components from RAW image data of a Bayer arrangement output from an image capturing unit 101, as shown in FIG. 9, and writes the planes to the memory 104 via a memory I/F unit 103. The G plane shown in FIG. 9 has an arrangement in which the G1 pixels are moved upward between two lines adjacent in the vertical direction of the Bayer arrangement and spread so as to be adjacent to the G0 pixels in the horizontal direction. For this reason, the horizontal size of the G plane is the same as the number of horizontal pixels of the RAW image data and twice larger than the number of horizontal pixels of the R plane or B plane. In step S801, the G0 pixels may be moved leftward between two columns adjacent in the horizontal direction of the Bayer arrangement and spread so as to be adjacent to the G1 pixels in the vertical direction. In this case, the vertical size of the G plane twice larger than that of the R plane or B plane.

In step S802, the feature analyzing unit 701 reads out the G plane from the memory 104 via the memory I/F unit 103, and calculates the variance. The formula of the variance is $$\sigma^2 = 1/N \Sigma_{i=1}^{N} (X_{ave} - X_i)^2 \quad (2)$$

where $\sigma^2$ is the variance, N is the total number of pixels of the G plane, Xave is the average of all pixel values of the G plane, and Xi is the value of the ith pixel of the G plane. The feature analyzing unit 701 supplies the calculated variance $\sigma^2$ to the control unit 108.

In step S803, a plane transforming unit 105 reads out the G plane from the memory 104 via the memory I/F unit 103, and generates a GL plane. The plane transforming unit 105 writes the generated GL plane to the memory 104 again via the memory I/F unit 103. The GL plane is generated by, for example, applying low-pass filter processing of wavelet transformation performed by a frequency transforming unit 107 once in the horizontal direction. However, the plane transforming unit 105 executes the filter processing of wavelet transformation while sub-sampling the even-numbered pixels along the horizontal direction of the G plane. For this reason, the horizontal size of the generated GL plane is the same as that of the R plane or B plane.

Assume that in step S801, the plane forming unit 102 forms the G plane by arranging the G0 and G1 pixels to be adjacent in the vertical direction between two columns adjacent in the horizontal direction of the Bayer arrangement. In this case, the plane transforming unit 105 applies low-pass filter processing of wavelet transformation performed by the frequency transforming unit 107 once in the vertical direction. The plane transforming unit 105 writes the generated GL plane to the memory 104 via the memory I/F unit 103.

In step S804, the plane transforming unit 105 reads out the G plane from the memory 104 via the memory I/F unit 103, and generates a GH plane. The plane transforming unit 105 writes the generated GH plane to the memory 104 again via the memory I/F unit 103. The GH plane is generated by, for example, applying high-pass filter processing of wavelet transformation performed by the frequency transforming unit 107 once in the horizontal direction. However, the plane transforming unit 105 executes the filter processing of wavelet transformation while sub-sampling the odd-numbered pixels along the horizontal direction of the G plane. For this reason, the horizontal size of the generated GH plane is the same as that of the R plane or B plane.

Assume that in step S801, the plane forming unit 102 forms the G plane by arranging the G0 and G1 pixels to be adjacent in the vertical direction between two columns adjacent in the horizontal direction of the Bayer arrangement. In this case, the plane transforming unit 105 applies high-pass filter processing of wavelet transformation performed by the frequency transforming unit 107 once in the vertical direction. The plane transforming unit 105 writes the generated GH plane to the memory 104 via the memory I/F unit 103.

In step S805, a color transforming unit 106 reads out the GL plane, the R plane, and the B plane from the memory 104 via the memory I/F unit 103, and executes luminance/color difference transformation processing for the three planes. The color transforming unit 106 writes a Y plane, a U plane, and a V plane obtained by the luminance/color difference transformation processing to the memory 104 via the memory I/F unit 103. Examples of real type irreversible transformations of luminance/color difference transformation are $$Y = 0.2126 \times R + 0.7152 \times GL + 0.0722 \times B$$

$$U = -0.1146 \times R - 0.3854 \times GL + 0.5 \times B$$

$$V = 0.5 \times R - 0.4542 \times GL - 0.0458 \times B \quad (3)$$

In step S806, the frequency transforming unit 107 reads out the Y plane, the U plane, the V plane, and the GH plane from the memory 104 via the memory I/F unit 103, and executes wavelet transformation to form sub-bands of the planes. The frequency transforming unit 107 supplies the formed sub-bands to a quantizing unit 109.

In step S807, the control unit 108 decides the plane target code amount of each plane. The control unit 108 performs weighting such that the plane target code amount of the Y plane becomes larger than the other plane target code amounts. The ratio of the plane target code amounts set here is Y:U:V:GH=40:15:15:30, as in the first embodiment. Note that a method of setting the sub-band target code amount of each sub-band is the same as in the first embodiment, and a description thereof will be omitted.

In step S808, the control unit 108 compares a plurality of preset thresholds (in this embodiment, T1 and T2 which have a relationship given by T1<T2) with the variance $\sigma^2$ supplied from the feature analyzing unit 701. If the variance $\sigma^2$ falls within the range of the threshold T1 (inclusive) to the threshold T2 (inclusive), the process advances to step S810 without changing the ratio of the plane target code amounts. Otherwise, that is, if variance $\sigma^2$<T1 or variance $\sigma^2$>T2, the control unit 108 advances the process to step S809.

In step S809, the control unit 108 corrects the plane target code amounts of the GH plane, the U plane, and the V plane based on the variance $\sigma^2$ output from the feature analyzing unit 701. If $\sigma^2$<T1, the RAW image data of the encoding target can be regarded as a flat image. Hence, the control unit 108 performs correction to decrease the plane target code amount of the GH plane. More specifically, the control unit 108 corrects the ratios of the plane target code amounts of Y:U:V:GH planes to 40:20:20:20. If variance $\sigma^2$>T2, the RAW image data of the encoding target can be regarded as an image with a large change (many edges) concerning the luminance. Hence, the control unit 108 performs correction to further increase the plane target code amount of the GH plane. More specifically, the control unit 108 corrects the ratio of the plane target code amounts of Y:U:V:GH planes to 40:10:10:40. Letting T be the total target code amount of the entire RAW image data, the target code amounts of the planes are obtained as follows.

[If $\sigma^2$<T1]
   Plane target code amount of Y plane=T×(40/100)
   Plane target code amount of U plane=T×(20/100)
   Plane target code amount of V plane=T×(20/100)
   Plane target code amount of GH plane=T×(20/100)
[If T1≤$\sigma^2$≤T2]
   Plane target code amount of Y plane=T×(40/100)
   Plane target code amount of U plane=T×(15/100)
   Plane target code amount of V plane=T×(15/100)
   Plane target code amount of GH plane=T×(30/100)
[If T2<$\sigma^2$]
   Plane target code amount of Y plane=T×(40/100)
   Plane target code amount of U plane=T×(10/100)
   Plane target code amount of V plane=T×(10/100)
   Plane target code amount of GH plane=T×(40/100)

The sub-band target code amounts of each plane are then decided. A method of setting the sub-band target code amounts is the same as in the first embodiment.

In step S810, the quantizing unit 109 quantizes transformation coefficient data supplied from the frequency transforming unit 107 by a quantization parameter (quantization step) corresponding to the sub-band target code amounts set from the control unit 108. The quantization parameter is decided based on the sub-band target code amounts set in step S807 or S809.

In step S811, an entropy encoding unit 110 compression-codes the transformation coefficient data of each sub-band after the quantization, and supplies the encoded data to an output unit 111. The output unit 111 concatenates the encoded data of the sub-bands of the planes in accordance with a preset order. The output unit 111 also creates a file header including information necessary for decoding. The output unit 111 writes a file formed from the file header and the subsequent encoded data to a storage medium 112.

As described above, according to the second embodiment, it is possible to at least obtain the same effect as in the above-described first embodiment. In the second embodiment, to estimate the amount of edges included in RAW image data of the encoding target, the feature analyzing unit 701 calculates the variance of the G plane. Based on the variance, the control unit 108 adaptively decides the ratio of the target code amounts of the U, V, and GH planes other than the Y plane. More specifically, if the variance output from the feature analyzing unit 701 falls between the two thresholds T1 and T2, the control unit 108 regards the variance as a standard, and sets the default target code amount ratio. If the variance is larger than the threshold T2, the control unit 108 determines that there are many edges (high-frequency components), and corrects the ratio of the target code amounts of the GH plane, the U plane, and the V plane such that the ratio of the target code amount of the GH plane becomes high. In contrast, if the variance output from the feature analyzing unit 701 is smaller than the threshold T1, the control unit 108 estimates that there are a few edges (high-frequency components), and corrects the ratio of the target code amounts of the GH plane, the U plane, and the V plane such that the ratio of the target code amount of the GH plane becomes low. That is, as the variance becomes large, the code amount assigned to the GH plane is increased, and the code amounts assigned to the U and V planes are decreased. This makes it possible to raise the compression ratio even for an image including many edges (high-frequency components). It is consequently possible to suppress degradation of subjective image quality.

Third Embodiment

In the above-described embodiments, a target code amount is set for entire RAW image data, and encoding is performed to meet the set target code amount. In this embodiment, however, instead of setting a target code amount, a quantization parameter is set for each sub-band, and the quantization is performed using the set quantization parameter. The basic arrangement is the same as in the first and second embodiments, and only different portions will be described.

In this embodiment, after wavelet transformation (step S305 or S806), a quantization parameter is set for each sub-band of each plane without calculating target code amounts (step S306 or S807). After that, quantization (step S307 or S810) and entropy encoding (step S308 or S811) are performed. The quantization parameter is set as follows. When
   quantization step value of 3LL of Y plane: 3LLy,
   quantization step value of 3HL of Y plane: 3HLy,
   quantization step value of 3LH of Y plane: 3LHy,
   quantization step value of 3HH of Y plane: 3HHy,
   quantization step value of 2HL of Y plane: 2HLy,
   quantization step value of 2LH of Y plane: 2LHy,
   quantization step value of 2HH of Y plane: 2HHy,
   quantization step value of 1HL of Y plane: 1HLy,
   quantization step value of 1LH of Y plane: 1LHy,
   quantization step value of 1HH of Y plane: 1HHy,
   quantization step value of 3LL of U/V plane: 3LLuv,
   quantization step value of 3HL of U/V plane: 3HLuv,
   quantization step value of 3LH of U/V plane: 3LHuv,
   quantization step value of 3HH of U/V plane: 3HHuv,
   quantization step value of 2HL of U/V plane: 2HLuv,
   quantization step value of 2LH of U/V plane: 2LHuv, quantization step value of 2HH of U/V plane: 2HHuv,
quantization step value of 1HL of U/V plane: 1HLuv,
quantization step value of 1LH of U/V plane: 1LHuv,
quantization step value of 1HH of U/V plane: 1HHuv,
quantization step value of 3LL of GH plane: 3LLgh,
quantization step value of 3HL of GH plane: 3HLgh,
quantization step value of 3LH of GH plane: 3LHgh,
quantization step value of 3HH of GH plane: 3HHgh,
quantization step value of 2HL of GH plane: 2HLgh,
quantization step value of 2LH of GH plane: 2LHgh,
quantization step value of 2HH of GH plane: 2HHgh,
quantization step value of 1HL of GH plane: 1HLgh,
quantization step value of 1LH of GH plane: 1LHgh, and
quantization step value of 1HH of GH plane: 1HHgh, the
quantization parameters of the sub-bands of the planes are set to meet $$3LLy=3HLy=3LHy=3HHy \leq 2HLy=2LHy<2HHy \leq 1 \\ HLy=1LHy<1HHy \quad (4)$$

$$3LLuv \leq 3HLuv=3LHuv<3HHuv<2HLuv=2LHuv<2 \\ HHuv \leq 1HLuv=1LHuv<1HHuv \quad (5)$$

$$3LLgh=3HLgh=3LHgh \leq 3HHgh \leq 2HLgh=2LHgh=2 \\ HHgh<1HLgh=1LHgh=1HHgh \quad (6)$$

$$3LLy \leq 3LLuv<3LLgh \quad (7)$$

$$1HHy<1HHuv<1HHgh \quad (8)$$

When setting the quantization parameters, a control unit 108 may calculate quantization step values that meet the above conditions. Alternatively, quantization step values that meet the above conditions may be stored in a nonvolatile memory (not shown) in advance and read out from the nonvolatile memory to set. If a compression ratio can be set, as in the second modification of the first embodiment, different quantization step values may be set in accordance with the compression ratio.

When the quantization step values having the above relationship are set, normally, generated code amount of Y plane>generated code amount of U/V plane>generated code amount of GH plane.

In image data, a luminance component is an important component. Hence, small quantization step values are set for the Y plane to perform quantization more finely than the other planes with relatively unnoticeable degradation, thereby making degradation unnoticeable. In addition, the Y plane, the U plane, and the V plane are components necessary to form an RGB image. Hence, the quantization step values are made smaller than those for the GH plane to perform quantization more finely than the GH plane, thereby making degradation unnoticeable. The quantization step values for the GH plane are made larger than those for the other planes to perform quantization more coarsely than the other planes, thereby suppressing the generated code amount.

The quantization step values for sub-bands of decomposition level 2 are 2HL=2LH<2HH in the Y, U, and V planes but 2HL=2LH=2HH in the GH plane. The quantization step values for sub-bands of decomposition level 1 are also 1HL=1LH<1HH in the Y, U, and V planes but 1HL=1LH=1HH in the GH plane. In the image, low-frequency components are more important. Hence, in the Y, U, and V planes, the quantization step values for the HL and LH sub-bands are made smaller than that for the HH sub-band to reduce degradation as compared to the HH sub-band. Since the HH sub-band is less important, the quantization step value is made large to do quantization more coarsely and suppress the generated code amount. In contrast, the GH plane is the data of the high-frequency component of green, and the high-frequency component is more important than in the other planes. For this reason, instead of setting a large quantization step value only for the HH sub-band as in the Y, U, and V planes, the same quantization step value as those for the HL and LH sub-bands is set to prevent degradation of the HH sub-band.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-211105, filed Oct. 27, 2015, and 2016-152293, filed Aug. 2, 2016, which are hereby incorporated by reference herein in their entirety.

What is claimed is:

1. An image encoding apparatus for encoding image data of a Bayer arrangement, the apparatus comprising:
   a luminance/color difference transforming unit configured to generate, from R and B component data of the image data of the Bayer arrangement and GL component data representing a low-frequency component of G component data calculated using G0 and G1 component data of the image data of the Bayer arrangement, (1) luminance component data formed from a luminance component, (2) first color difference component data formed from a first color difference component, and (3) second color difference component data formed from a second color difference component;
   a generating unit configured to generate GH component data representing a high-frequency component of G component data calculated using G0 and G1 component data of the image data of the Bayer arrangement; and an encoding unit configured to encode each component of the luminance component data, the first color difference component data, the second color difference component data, and the GH component data, wherein the encoding unit performs encoding such that (1) a code amount of the luminance component data is more than that of the first and second color difference component data and (2) a code amount of the GH component data is less than that of the first and second color difference component data.

2. The apparatus according to claim 1, wherein the encoding unit sets a target code amount of each component data such that the target code amount of the luminance component data>the target code amount of the first color difference component data≈the target code amount of the second color difference component data>the target code amount of the GH component data holds, and encodes each component data to meet the set target code amount.

3. The apparatus according to claim 1, wherein the encoding unit generates a plurality of sub-bands by wavelet-transforming the component data, and performs encoding for each of the generated sub-bands.

4. The apparatus according to claim 3, wherein the encoding unit decides target code amounts of the sub-bands by distributing the target code amount assigned to the component data to each sub-band, wherein the apparatus further comprises a compression ratio setting unit configured to set a compression ratio of the image data, and wherein the encoding unit changes a ratio of the target code amount to be distributed to each sub-band in accordance with the compression ratio set by the compression ratio setting unit.

5. The apparatus according to claim 3, wherein the encoding unit performs quantization based on a quantization parameter set for each sub-band and encodes the data after the quantization.

6. The apparatus according to claim 5, wherein the encoding unit sets the quantization parameters of sub-bands of a predetermined decomposition level such that for the luminance component data, the first color difference component data, and the second color difference component data, the quantization parameter of an HH sub-band becomes larger than the quantization parameters of an HL sub-band and an LH sub-band, and for the GH component data, the quantization parameter of the HH sub-band becomes not less than the quantization parameters of the HL sub-band and the LH sub-band.

7. The apparatus according to claim 5, wherein the encoding unit sets the quantization parameters of sub-bands of a predetermined decomposition level such that for the GH component data, the quantization parameter of an HH sub-band becomes equal to the quantization parameters of an HL sub-band and an LH sub-band.

8. The apparatus according to claim 1, wherein the GL component data is generated by addition of the G0 component data and the G1 component data, and wherein the GH component data is generated by subtraction of the G0 component data and the G1 component data.

9. An image encoding apparatus for encoding image data of a Bayer arrangement, the apparatus comprising:

a luminance/color difference transforming unit configured to generate, from R and B component data of the image data of the Bayer arrangement and GL component data representing a low-frequency component of G component data calculated using G0 and G1 component data of the image data of the Bayer arrangement, (1) luminance component data formed from a luminance component, (2) first color difference component data formed from a first color difference component, and (3) second color difference component data formed from a second color difference component;

a generating unit configured to generate GH component data representing a high-frequency component of G component data calculated using G0 and G1 component data of the image data of the Bayer arrangement; and an encoding unit configured to encode each component of the luminance component data, the first color difference component data, the second color difference component data, and the GH component data, wherein the encoding unit performs wavelet-transform for each component to generate a plurality of sub-bands and encodes the plurality of sub-bands for each component, and wherein when encoding sub-bands of a predetermined decomposition level, for the luminance component data, the first color difference component data, and the second color difference component data, the target code amounts are set such that the target code amount of an HH sub-band becomes smaller than the target code amounts of an HL sub-band and an LH sub-band, and for the GH component data, the target code amounts of the sub-bands are set such that a ratio of the target code amount of the HH sub-band to the target code amount of one of the HL sub-band and the LH sub-band becomes higher than in the luminance component data, the first color difference component data, and the second color difference component data.

10. The apparatus according to claim 9, wherein when encoding the sub-bands of the predetermined decomposition level, for the luminance component data, the first color difference component data, and the second color difference component data, the encoding unit performs the encoding by setting the target code amounts such that the target code amount of the HH sub-band becomes smaller than the target code amounts of the HL sub-band and the LH sub-band, and for the GH component data, the encoding unit performs the encoding by setting the target code amounts such that the target code amount of the HH sub-band becomes not less than the target code amounts of the HL sub-band and the LH sub-band.

11. A method of controlling an image encoding apparatus for encoding image data of a Bayer arrangement, the method comprising:

generating, from R and B component data of the image data of the Bayer arrangement and GL component data representing a low-frequency component of a G component calculated using G0 and G1 component data of the image data of the Bayer arrangement, (1) luminance component data formed from a luminance component, (2) first color difference component data formed from a first color difference component, and (3) second color difference component data formed from a second color difference component;

generating GH component data representing a high-frequency component of G component data calculated using G0 and G1 component data of the image data of the Bayer arrangement; and encoding each component of the luminance component data, the first color difference component data, the second color difference component data, and the GH component data, wherein the encoding is performed such that (1) a code amount of the luminance component data is more than that of the first and second color difference component data and (2) a code amount of the GH component data is less than that of the first and second color difference component data.

12. A non-transitory computer-readable storage medium storing a program which causes a computer to execute the steps of a method of controlling an image encoding apparatus for encoding image data of a Bayer arrangement, the method comprising:

generating, from R and B component data, of the image data of the Bayer arrangement and GL component data representing a low-frequency component of a G component calculated using G0 and G1 component data of the image data of the Bayer arrangement, (1) luminance component data formed from a luminance component, (2) first color difference component data formed from a first color difference component, and (3) second color difference component data formed from a second color difference component;

generating GH component data representing a high-frequency component of G component data calculated using G0 and G1 component data of the image data of the Bayer arrangement; and encoding each component of the luminance component data, the first color difference component data, the second color difference component data, and the GH component data, wherein the encoding is performed such that (1) a code amount of the luminance component data is more than that of the first and second color difference component data and (2) a code amount of the GH component data is less than that of the first and second color difference component data.

* * * * *